(12) United States Patent
Eldar

(10) Patent No.: US 7,131,841 B2
(45) Date of Patent: Nov. 7, 2006

(54) EDUCATIONAL GLOBE-LIKE STRUCTURE FOR TEACHING COLORS

(76) Inventor: Meir Eldar, 47 Uziel Street, Jerusalem, 96423 (IL)

(*) Notice: Subject to any disclaimer, the term of this patent is extended or adjusted under 35 U.S.C. 154(b) by 0 days.

(21) Appl. No.: 10/961,497

(22) Filed: Oct. 7, 2004

(65) Prior Publication Data

US 2005/0089833 A1    Apr. 28, 2005

(30) Foreign Application Priority Data

Oct. 23, 2003    (IL) .................................... 158570

(51) Int. Cl.
*G09B 19/00*    (2006.01)

(52) U.S. Cl. .................. 434/98; 434/131; 434/402; 446/85

(58) Field of Classification Search .......... 434/98, 434/131, 402; 446/85–128
See application file for complete search history.

(56) References Cited

U.S. PATENT DOCUMENTS

| 1,753,619 | A | * | 4/1930 | Norberg ...................... 434/98 |
| 4,009,527 | A | * | 3/1977 | Scott et al. ................... 434/98 |
| 4,211,016 | A | * | 7/1980 | Eldar ........................... 434/98 |
| 4,377,286 | A | * | 3/1983 | Constantinescu ....... 273/153 S |
| 5,026,286 | A | * | 6/1991 | Hellwig ....................... 434/98 |
| 5,182,616 | A | * | 1/1993 | Roberts et al. ............. 356/402 |
| 5,634,795 | A | * | 6/1997 | Davies ......................... 434/98 |

OTHER PUBLICATIONS

Bruce MacEvoy, "Color Models & Color Wheels", Apr. 10, 2000, www.handprint.com/HP/WCL/color6.html.*

* cited by examiner

*Primary Examiner*—Dmitry Suhol
(74) *Attorney, Agent, or Firm*—Bachman & LaPointe, P.C.

(57) ABSTRACT

The invention provides an educational globe-like structure for teaching colors and the relationship between different colors, the globe-like structure being arranged to display the interrelationship between colors simultaneously in both longitudinal and latitudinal directions, characterized in that the globe is constructed of at least 15 different colored interlocking toy building blocks, wherein blocks of at least 3 basic colors are disposed around the equator of the globe, and the poles of the globe-like structure are formed, respectively, of 2 further basic colors and the remaining blocks intermediate between the blocks of basic colors represent interim colors between the basic colors.

10 Claims, 11 Drawing Sheets

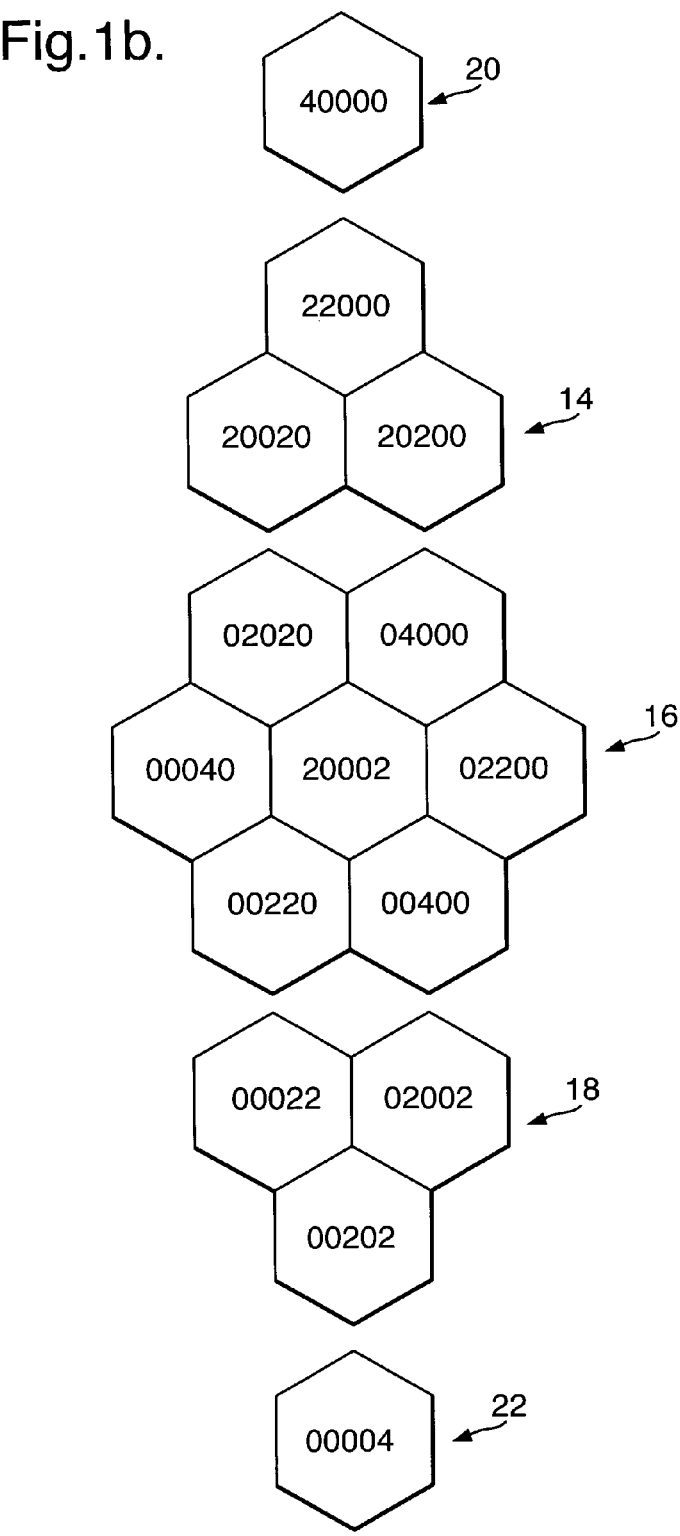

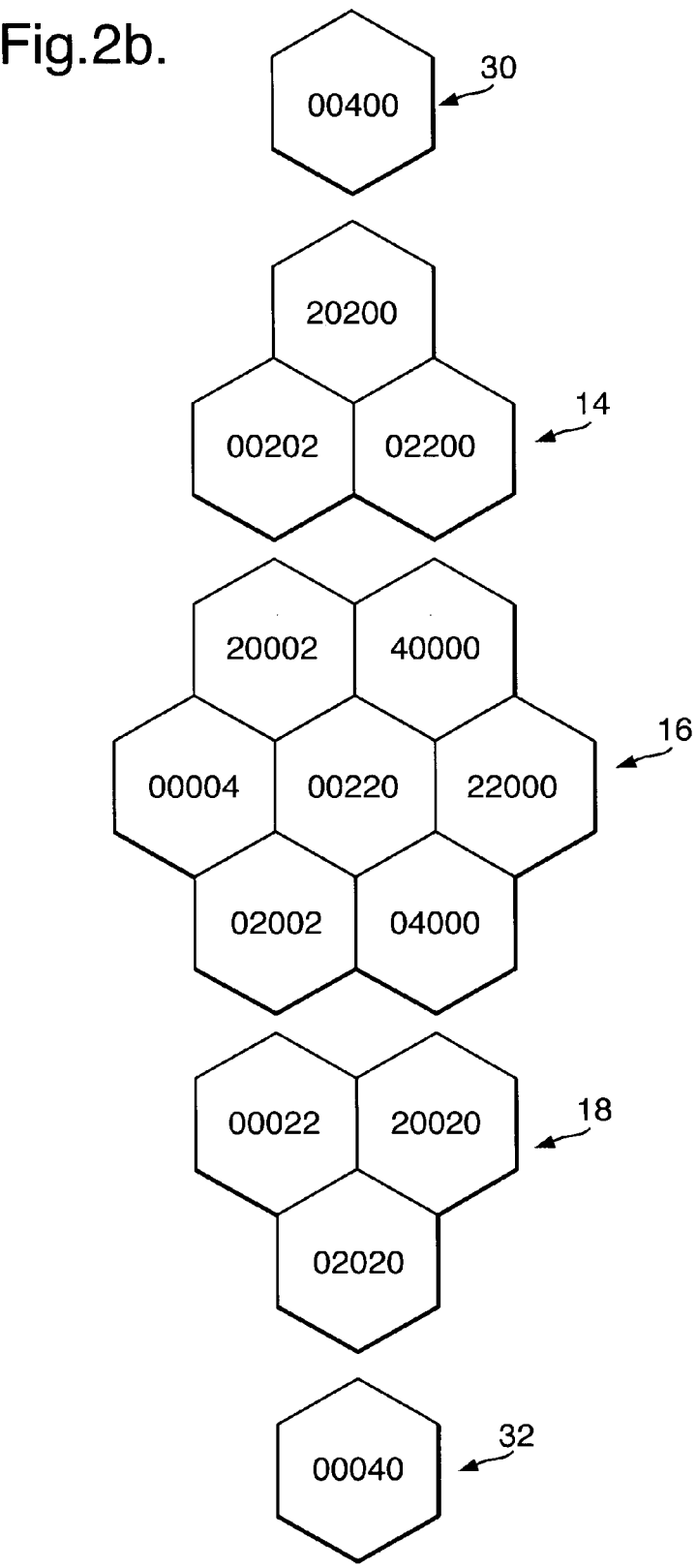

EDUCATIONAL GLOBE-LIKE STRUCTURE FOR TEACHING COLORS

The present invention relates to the demonstration of colors and the relationships between different colors.

More particularly, the invention can be used to demonstrate that with the defined set of 5 basic colors of which 3 are the chromatic colors red, blue and yellow and the other are the 2 achromatic colors white and black, it is possible to construct a systematic color globe, which includes virtually all colors. The invention provides for the construction of several globe sizes, and provides efficient building blocks which can be used to construct many other forms.

The globe comprises colored toy building elements which are arranged to demonstrate the relationships between different colors and to be useful in teaching concepts such as hue, value and chroma and to enable the creation of artistic arrangements. The present invention is a further development of the color concept of U.S. Pat. No. 4,211,016 and utilizes building elements described in Israel Patent No. 85194 the relevant teachings of which are incorporated herein by reference which building elements heretofore have never been suggested for use in the creation of color globes despite the fact that more than a decade has passed since the filing thereof.

The color of an object is in many cases an important feature of a manufactured product or of a paint or anodized coating applied thereto. In some products, for example lenses used for traffic lights, paints, colored pens, some types of textiles, and ink, color is the dominant feature of the product. Multi-national manufactures who order components of one product in several different continents are particularly concerned that when the product is assembled using parts made in far-apart locations that the color of components which are intended to match really do so. Such situations have lead to the necessity for precisely defining colors. Precision matching of colors includes setting standards for the light which is to illuminate the surface to be viewed, the surface itself (polished, matte, ribbed etc.) and the viewer (different people perceive light colors differently, people classified as "color blind" being an extreme example).

The introduction of systematic numbering systems to define colors has been helpful in the communication of color information. In the present invention the numbering system used is that described in U.S. Pat. No. 4,211,016.

Due to the importance of teaching and understanding color relationships, there has arisen a need for improved aids for teaching, learning, working and playing.

When three different variable factors (hue, value, and chroma) are to be represented simultaneously, a three-dimensional figure, for example a globe-like or brick or cube-like form, is needed. Two-dimensional representations of a solid form can be used to represent one set of values in place of the three-dimensional model, but a solid model can have utility beyond that possible from a flat drawing.

The concept of organizing the world of colors and defining the place of colors and their interrelationship using the model of a color globe was explored by Munsell already in 1940 as discussed and reviewed in U.S. Pat. No. 4,211,016.

The Munsell color solid is seen as a globe-like paper model and in book form in INDUSTRIAL DESIGN in ENGINEERING by Flurscheim (Design Council London, 1983) pp 136–7.

As noted in U.S. Pat. No. 4,211,016, according to these models, chromatic colors are described in accordance with their order in the spectrum wherein the ends of the spectrum are joined and the ultraviolet and infra-red meet in a closed color circle forming the "equator" of the color globe and the achromatic colors black and white form the "poles" of said globe. The envelope of the "globe" or "double cone" contains the chromatic colors of the equator which change towards white or black where they change their chroma gradually depending on the size of the globe as they approach the "poles". The represented inner volume of the globe contains the color points formed by interaction between the colors on the "envelope" and according to this model the center of the globe will be gray as a result of the interaction of the black and white and the complementary chromatic colors where they change the intensity of chroma. As a result, the glowing colors of the equator are losing chroma gradually toward the poles and the center of the globe. As the size of the globe increases the graduated steps of transition of the glowing colors to the poles and center increase and are more detailed.

A services vendor (architect, interior designer, curtains salesperson for example) discussing colors with a customer, is often required to show the effect of contrasting colors. Sometimes the vendor is willing to lend a color sample to the customer for further comparisons. In education, many different combinations of colors may be shown to students, and the number of divisions in each of the three factors (hue, chroma and value) may be larger or smaller depending on the size of the globe. Known color globes are however unsuitable for tasks of this nature, as they are not changeable and do not systematically show the neighboring colors at the same time.

Bearing in mind this state of the prior art there is now provided a color globe which overcomes the limitations of the prior art and can be expanded to demonstrate more or fewer intermediate grades. Furthermore any selected color and its neighbors as well as chosen complementary colors can be removed from the globe and can conveniently be taken for purposes of comparison to a remote location. Any section of the globe can be removed to show in sectional style the inner part of the globe, which can represent one of the three properties defining a color. A color globe that shows "pages" can also be constructed so that also the inner side of the globe can be seen. Furthermore, as described hereinafter, inside a color globe constructed of 65 related colors out of 70 colors, there is found a 15 color globe which is a systematically "low chroma globe".

The present invention meets these requirements by providing an educational globe-like structure for teaching colors and the relationship between different colors, said globe-like structure being arranged to display the interrelationship between colors simultaneously in both longitudinal and latitudinal directions, characterized in that said globe is constructed of at least 15 different colored interlocking toy building blocks, wherein blocks of at least 3 basic colors are disposed around the equator of said globe, and the poles of said globe-like structure are formed, respectively, of 2 further basic colors and the remaining blocks intermediate between said blocks of basic colors systematically represent interim colors between said basic colors. This is a novel systematic color globe which enables a change in color relation by changing the basic color location in the equator and at the poles and some 10 different systematic color globes can be created according to this novel system as described hereinafter.

The term "basic color" as used herein is intended to denote the known basic chromatic colors of red, blue and yellow as well as the basic achromatic colors of black and white.

In preferred embodiments of the present invention there is provided an educational globe-like structure as defined above wherein said poles are formed utilizing chromatic colors.

In preferred embodiments of the present invention there is provided a globe-like structure as defined, arranged to simultaneously display 34 related colors out of 35, 3 of which colors are basic colors arranged around said equator and wherein the remaining 2 basic colors are on the poles. By changing the location of the basic colors the other colors and the remaining colors also change their location to create other color images.

In especially preferred embodiments of this invention, all of the other colors in the globe-like structure are systematically arranged according to their relative values vis a vis the basic colors.

In other preferred embodiments of the present invention there is provided a globe-like structure as defined arranged to simultaneously display 65 related colors out of 70, 3 of which colors are basic colors arranged around said equator and wherein the remaining 2 basic colors at the poles. The five remaining blocks which are not utilized in said arrangement of 65 blocks are available for interchange as mentioned above and as will also be explained in more detail hereinafter.

Thus in one embodiment there is provided an educational globe-like structure for teaching colors and the relationship between different colors, said globe-like structure being arranged to display the interrelationship between colors simultaneously in both longitudinal and latitudinal directions, characterized in that said globe is constructed of at least 15 different colored interlocking toy building blocks, wherein 6 colors of the rainbow including 3 chromatic colors are disposed around the equator of said globe, and the poles of said globe-like structure are formed, respectively, of black and white building blocks. This is the traditional globe.

In yet other preferred embodiments of the present invention there is provided a globe-like structure formed at any one time from 65 out of 70 related colors, 12 of which are colors of the rainbow arranged around said equator of said globe, and black and white at the poles which create the traditional color globe. As mentioned however, according to the present invention it is no longer necessary to be bound to the principles of positioning the achromatic colors black and white at the poles and by placing other basic colors such as red and blue respectively at the poles, and such basic colors as white, black and yellow at the equator a different systematic color globe can be created, as will be described with reference to FIG. 2.

In a most preferred embodiment of the present invention there is provided a globe-like structure wherein said toy building blocks are of hexagonal interlocking form, lower edges of adjacent higher blocks being insertable into slots in the upper face of similar lower blocks. The "size" of the globe and the quantity of colors is an outcome of the formula:

$$\frac{m+n-2}{m-1} = \frac{8!}{4!4!}$$

wherein m=5 and n=5.

As will be realized, using this formula and changing the values of m and n, larger globes can be constructed. Thus, for example, if m=5 and n=7 the quantity of colors (blocks) will be 210 arranged in 13 tiers. In such a globe 175 blocks will be utilized at any one time with 35 blocks available for interchange when other globe images are constructed.

Yet further embodiments of the invention will be described hereinafter.

The following is a summary of the numbering system used in the present specification which numbering system is also described in detail in U.S. Pat. No. 4,211,016:

A 5 digit number represents 5 basic colors or hues: white yellow red blue black wherein m =5.

The strength of a color component is represented by the value of the digit.

For example if 5 subdivisions are available, the digit 4 means totally dominant and 0 means none present.

The 5 basic colors are, red which is defined by 00400, yellow which is defined by 04000, blue which is defined by 00040, white which is defined by 40000, and black which is defined by 00004. The total number of colors possible according to these premises is 70, wherein the range between the basic colors included is 5(n), according to the following formula:

$$\frac{m+n-2}{m-1} = \frac{5+5-2}{5-1} = \frac{8}{4} = \frac{8!}{4!4!} = 70$$

Using said formula it will now be understood that when n=3 the total number of possible colors is 15, when n=4 the total number of possible colors is 35, when n=6 the total number of possible colors is is 126 and when n=7 the total number of possible colors is 210 etc., the latter being shown by the following expanded formula:

$$\frac{5+7-2}{5-1} = \frac{10}{4} = \frac{10!}{4!6!} = 210$$

Possible color globes that can be created according to the present invention by varying the value of n, when m is the fixed value 5, are summarized in the following Table.

| n | Total | Globe | Tiers | Remains for replacement |
|---|-------|-------|-------|-------------------------|
| 3 | 15    | 15    | 5     | 0                       |
| 4 | 35    | 34    | 7     | 1                       |
| 5 | 70    | 65    | 9     | 5                       |
| 6 | 126   | 111   | 11    | 15                      |
| 7 | 210   | 175   | 13    | 35                      |

As explained before, the physical structure of the globe does not allow for all of the theoretical colors to be simultaneously displayed once n is 4 or larger and therefore the last column of the above Table sets forth the number of blocks which are not utilized in each respective arrangement, however which are available for interchange once the globe is dismantled and reconstructed for additional color images.

The various color combinations make possible the display of almost all secondary colors, although, despite popular belief to the contrary, there are no three basic colors which can be combined to produce all possible colors.

The invention will now be described in connection with certain preferred embodiments with reference to the following illustrative Figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1b is a schematic layout of the different layers shown in FIG 1a;

FIG. 2b is a schematic layout of the different layers shown in FIG. 2a;

FIG. 3b is an elevational view of the 5 interior blocks of the 7-tier globe of FIG. 3a;

FIG. 4b is an elevational view of the 15 interior blocks of the 9-tier globe of FIG. 4a;

FIG. 5b is a view looking up into the hollow block seen in FIG. 5a;

Figure 1A:
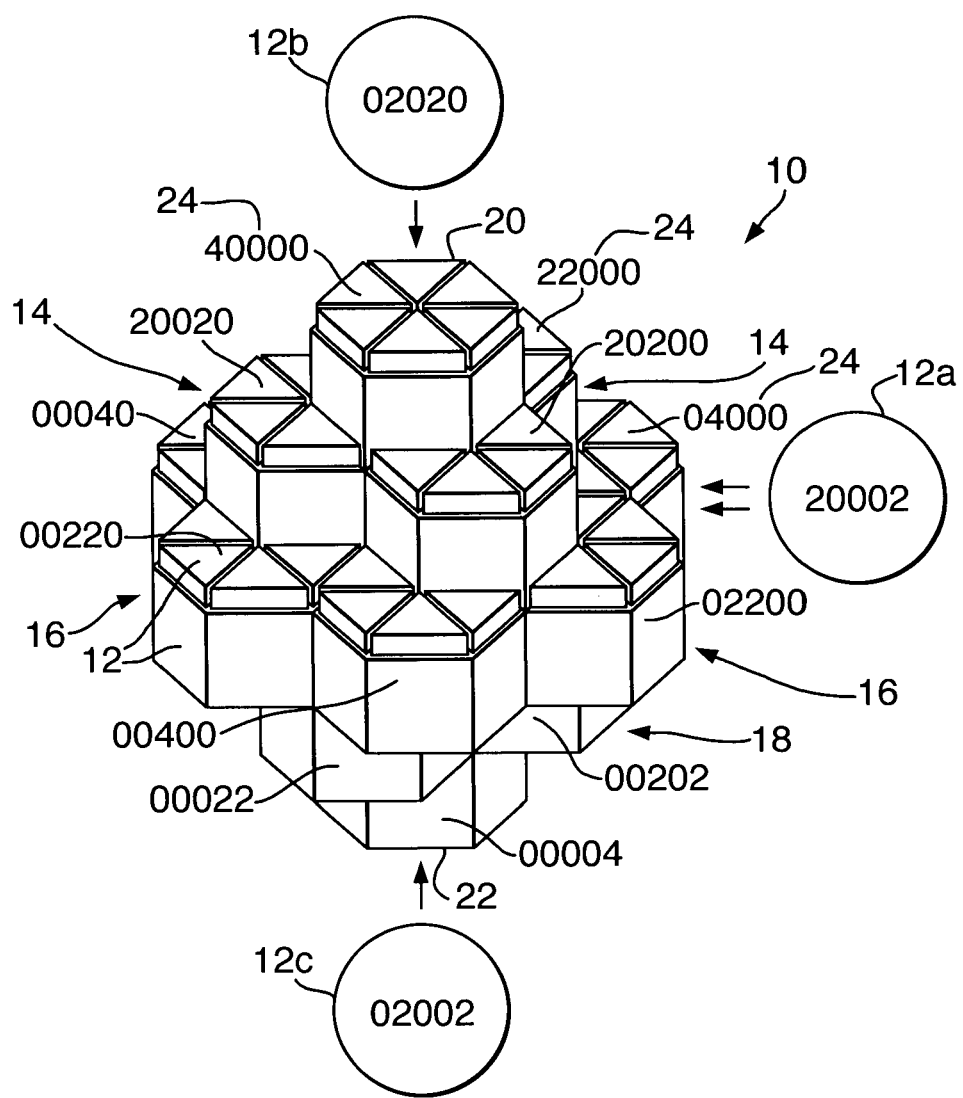
FIG. 1a is a perspective view of a 5-tier preferred embodiment of the color globe according to the invention wherein each block carries a number corresponding to its own color.

There is seen in FIGS. 1a and 1b an educational globe-like small structure 10 for teaching colors and the relationship between different colors.

The globe-like structure 10 is arranged to display the interrelationship between a small number of colors simultaneously in both longitudinal and latitudinal directions. It is understood that with an increase in size of the globe the gradation of colors increases.

The globe is constructed of fifteen differently-colored interlocking toy building blocks 12, which are seen arranged in three tiers 14, 16, 18 and two poles 20, 22. The central tier 16 includes a central block 12a shown outside of the globe and represented as a circle wherein according to the coding system, the color of said central block is gray and said block is not viewed as part of the envelope of the globe. Two further blocks 12b and 12c which are not visible from the front perspective of said Figure are represented as circles wherein e.g. block 12b according to the coding system has the behind the rainbow color (green), and is the rear block of central tier 16 while block 12c forms the rear block of tier 18.

Six colors of the rainbow are disposed around the equator tier 16 of the globe, although the rear block of said tier, which according to the coding system is the block with code 02020, is not seen. As discussed hereinbefore, the center block 12a having the code 20002 is also not seen in the envelope and thus this central tier 16 has a total of seven blocks. Above and below the equator respectively are tiers 14 and 18 each containing three blocks, to total thirteen. Additionally the poles 20, 22 of the globe-like structure 10 are formed, respectively, of two further basic colors, black and white building blocks thereby forming a total of fifteen blocks which presents the traditional globe.

The six blocks 12, which are disposed between the basic colors, have intermediate colors which create the equator of the rainbow colors.

Value is represented by latitude. The blocks in tier 18 have lower values because they are closer to the black block 22 and darker than the upper blocks in tier 14, which are closer to the white block 20. Value however also varies with longitude in that it is to be noted that the blocks in tier 16 are not "neutral" to the value measurements and the blocks closest to the yellow block have a higher value than the blocks closest to the blue-purple blocks, while the line red-gray-green is neutral between black and white. In the longitudinal direction hue is represented, the order being as seen in the rainbow, although different therefrom in that violet is next to red to form a continuation of the rainbow colors in the form of a circle. In addition, the rainbow colors gradually decrease in chroma from the equator in the direction of the poles, and from the envelope of the equator in the direction of the center.

A preferred form of interlocking block which is particularly suited for the present purpose will be described with reference to FIG. 5.

Each building block 12 is marked with a number 24 representing its own color as defined by the numbering system.

The numbering system defines all colors, and is preferably expanded to represent the three color properties known as chroma, hue and value.

A five digit number 24 represents five basic colors or hues: white, yellow, red, blue and black.

The strength of a color component is represented by the value of the digit.

In the present example where five subdivisions are available, the digit 4 (this depends on the globe size) means totally dominant and 0 means none present.

The system used in the present invention has five basic colors. These are:

Red, defined by the number 00400;

Yellow defined by the number 04000;

Blue defined by the number 00040;

White defined by the number 40000 which is the highest number; and

Black is defined by the number 00004 which is the lowest number

Figure 2A:
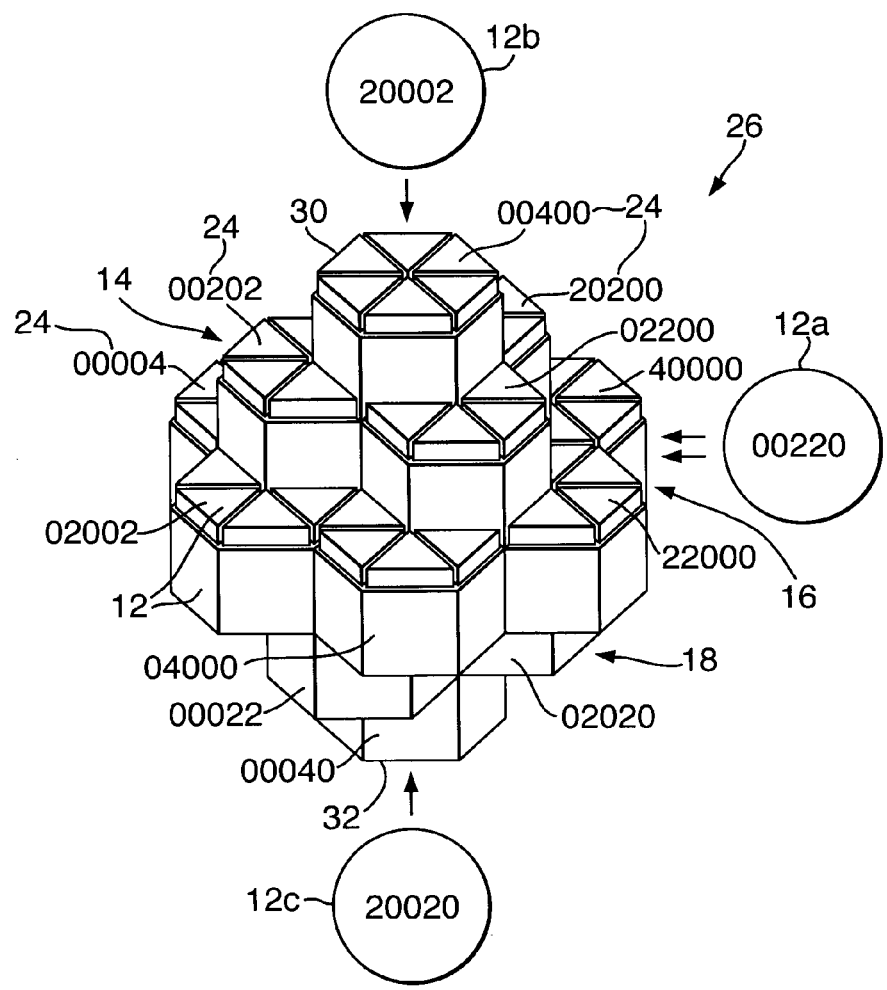
FIG. 2a is also a perspective view of a 5-tier preferred embodiment of the color globe, the colors being arranged in an unconventional but systematic order.

FIG. 2a and 2b illustrate a globe-like structure 26 which is spatially identical to the structure 10 seen in the previous Figure and in which identical numbers have been used to identify identical parts. However the colors are arranged in a different systematical novel manner by relocation of the basic colors.

In these novel embodiments, enabled for the first time by the present invention, the equator 16 includes e.g. the basic colors white, yellow and black, while the poles 30, 32 are red and blue respectively. The five-digit number 24 indicates the interrelationships of the intermediate blocks. In such arrangements some ten different globes of novel systematic images can be constructed.

As with FIGS. 1a and 1b, in FIGS. 2a and 2b the globe 26 is constructed of the same fifteen differently-colored interlocking toy building blocks 12, which are seen arranged in three tiers 14, 16, 18 and two poles 30, 32 however in which the location of the basic colors have been changed. The central tier 16 includes a central block 12a shown outside of the globe and represented as a circle wherein according to the coding system, the color of said central block 12a is purple and said block is not viewed as part of the globe which is presented above. Two further blocks 12b and 12c which are not visible from the front perspective of said Figure are represented as circles wherein e.g. block 12b according to the coding system has the value 20002 which is gray, and is the rear block of central tier 16 while block 12c which has the value 20020 which is light blue, forms the rear block of tier 18.

Figure 3A:
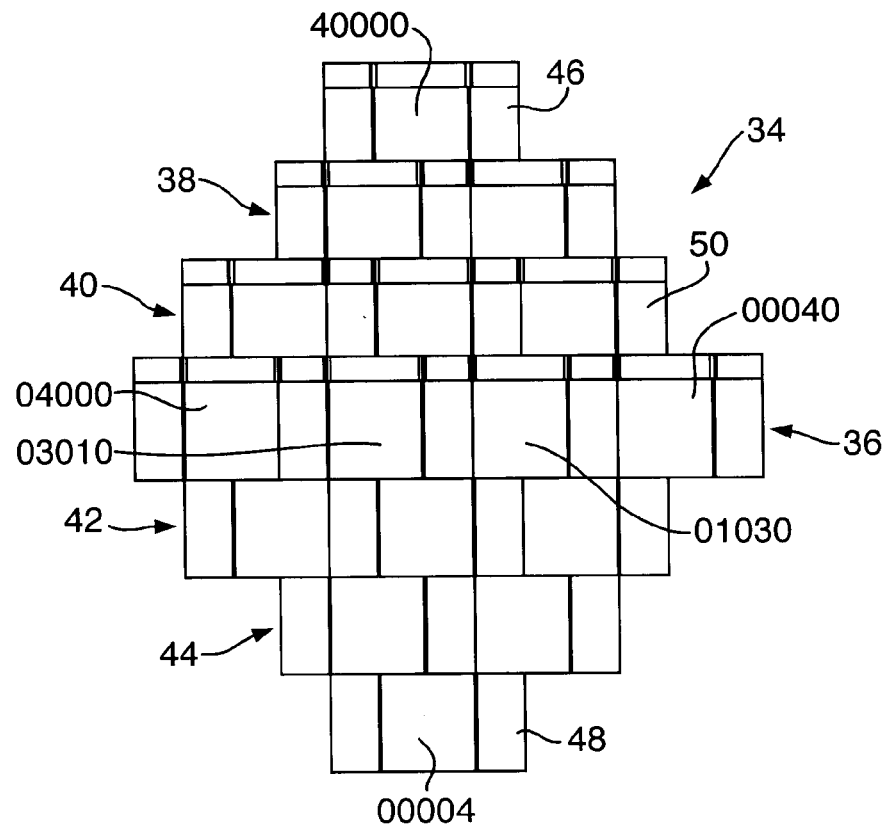
FIG. 3a is an elevational view of a 7-tier globe including white and black wherein m=5 and n=4; and which therefore is formed from a set that contains 35 blocks according to the above formula although which globe in practice contains only 34 blocks.

FIG. 3a illustrates an intermediate-size seven-tier globe-like structure 34 arranged to display thirty-five colors wherein the globe is constructed of thirty-four color blocks. The remaining one block which is not utilized in the arrangement of thirty-four blocks is available for use when the basic colors change their locations in the equator and the poles as seen in FIG. 2 above to arrange other color globe images.

Figure 3B:
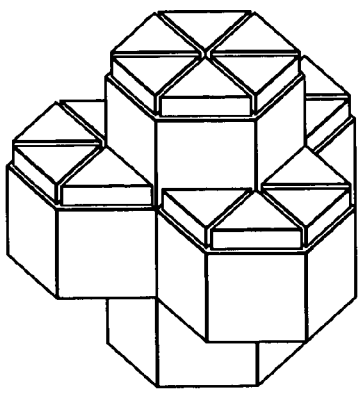

Of these, nine are colors of the rainbow arranged around the equator 36. A further twenty colors are found in the remaining envelope of the six tiers 38, 40, 42, 44 including the poles 46, 48. The total of thirty-four colors of the globe is reached by adding the five hidden colors which are located inside the globe structure 34, to reach the total of thirty-four blocks which are not seen. The five hidden color blocks which form the interior of the color globe of FIG. 3a can be seen in FIG. 3b.

Figure 4A:
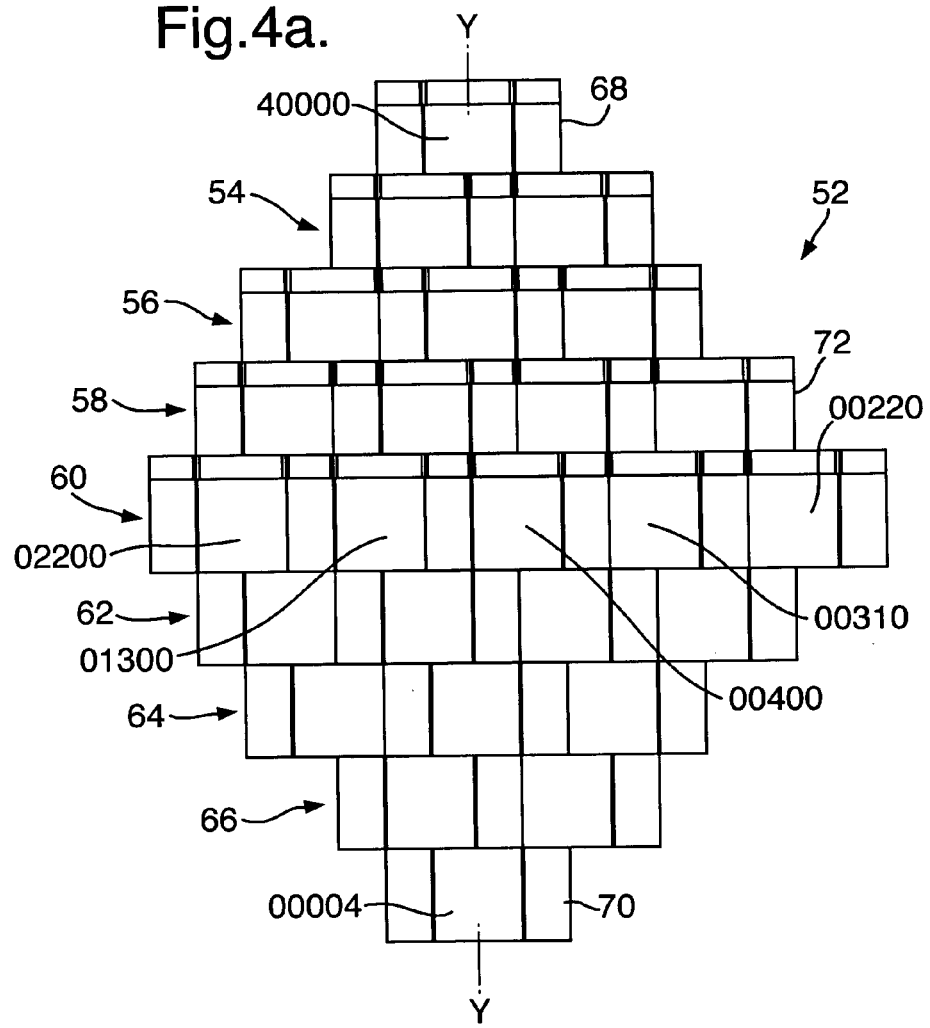
FIG. 4a is an elevational view of a 9-tier globe, also showing the pole pieces wherein m=5 and n=5; and which therefore is formed from a set that contains 70 blocks according to the above formula although which globe in practice contains only 65 blocks.

Seen in FIG. 4a is a large globe-like structure 52 having nine tiers 54–66 (including the poles 68, 70) to simultaneously display sixty-five out of seventy related colors, three of which are basic primary colors included in the colors arranged around the equator tier 60 and white and black at the poles. The remaining five colors change according to the allocations of the basic color to create the different images of the globe as shown above in FIG. 2.

The primary colors are combined in various proportions to produce sixty-five secondary colors from a total of seventy related colors. The structure is of a size to allow convenient demonstration of a third parameter in the direction leading from an outer part of the globe towards the globe axis YY which can also be seen in the "pages globe" as shown in FIG. 6b of the axis white-gray-black.

Figure 7A:
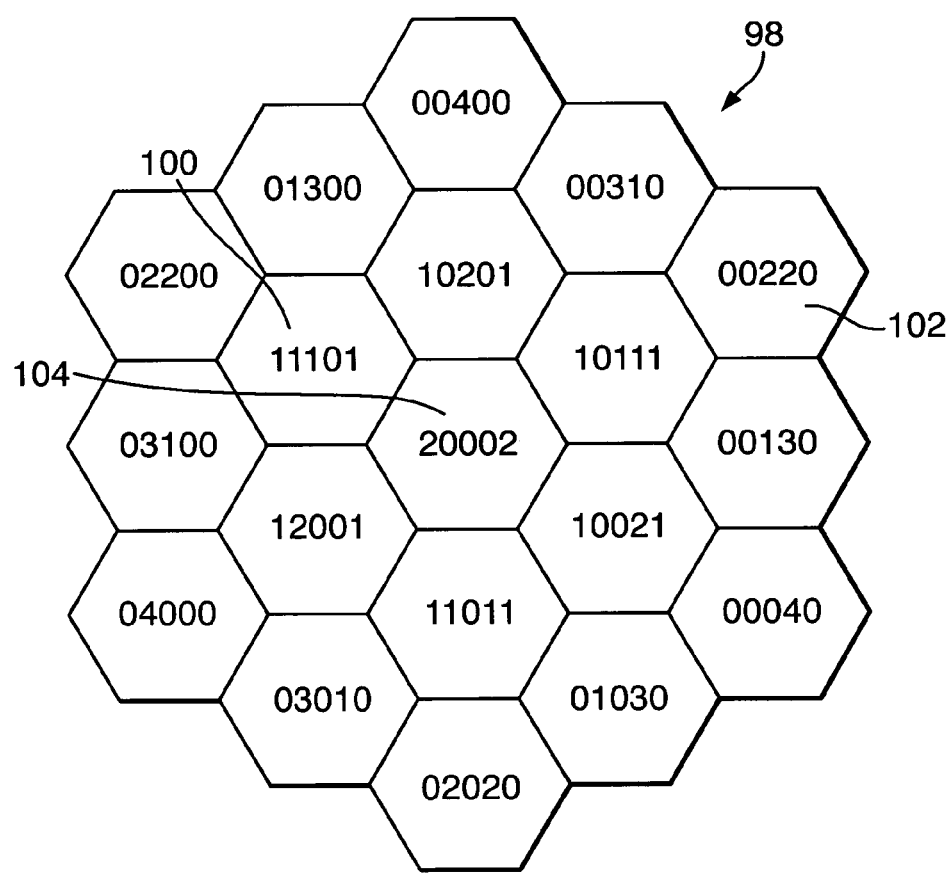
FIG. 7a is a top view of a central tier of the color globe of FIG. 4a showing a color circle with both internal and external blocks.

The sixty-five colored blocks that form the globe of FIG. 4a are chosen out of a set of seventy colors according to the location of the basic colors, wherein twelve are colors of the rainbow arranged around the equator tier 60, seven further colors are disposed inside the equator circle, as shown in FIG. 7a, to total nineteen. A further forty-six colors are exposed in the remaining six tiers 54, 56, 58, 62, 64, 66 plus the two poles 68, 70, total sixty-five. Again the remaining five colors are available for interchange when the globe is dismantled and reconstructed with the location of the five basic colors changed to create new images of the globe as shown in FIG. 2 above.

Figure 4B:
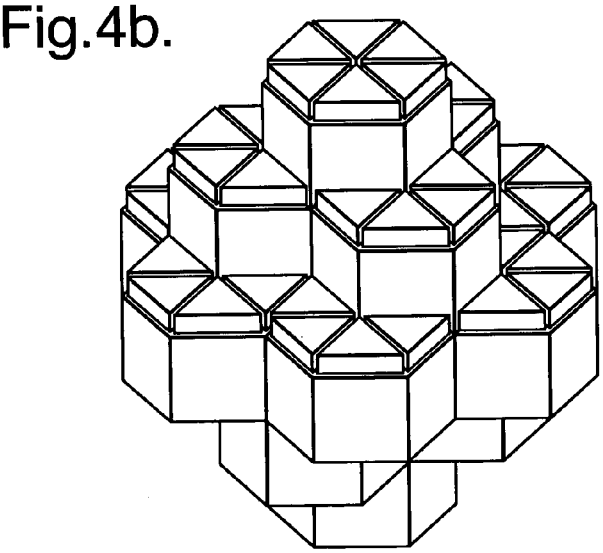

Fifteen colors are located inside the globe in the five tiers 56, 58, 62, 64 nearest the equator tier 60 included, and are not seen. They construct an inner globe. In the case of a traditional globe it is a systematic "gray" globe as in FIG. 4b and FIG. 1. The inner fifteen colors are selected to demonstrate the behavior of chroma, which decreases towards the axis YY and the poles and increases towards the rainbow colors. This can also be seen in "page globe" in FIG. 6b below.

The number of building blocks which may be used inside each tier is of course dependent on the number of blocks making up the outer circle of this tier. A tier comprising six outer blocks can have one inner block, a tier comprising nine outer blocks will usually contain three inner blocks, while a twelve block outer circle, seen serving as the equator tier 60 in the present embodiment, can contain seven inner blocks, as will be seen in FIG. 7a. It can be seen in FIG. 7b that an eighteen block outer circle will contain nineteen inner blocks.

Figure 5A:
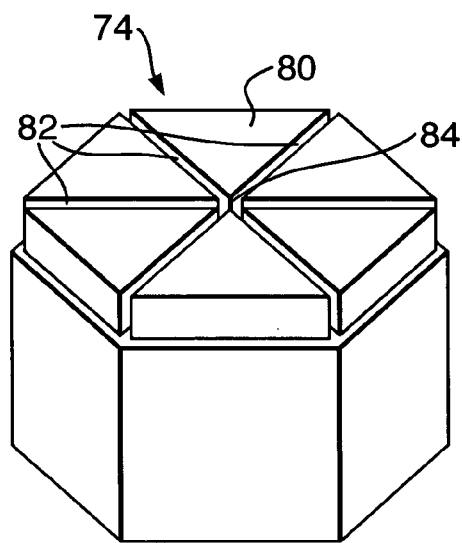
FIG. 5a is a perspective view of a hexagonal toy building block suitable for use in construction of a color globe and other solid color structures.
Figure 5B:
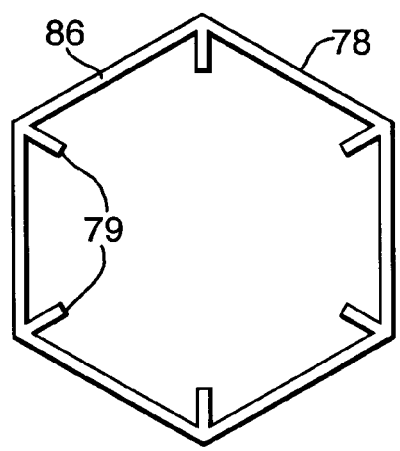

Referring now to FIGS. 5a and 5b, there is depicted an interlockable hexagonal toy building block 74 particularly suitable for use in construction of a color globe structure.

The block 74 is shaped substantially as a hexagonal prism. The block 74 is hollow, the lower face 76 comprising edges which in combination form a hexagon 78. Small internal extensions 79 facilitate stabilizing stacked blocks.

The upper face 80 of the block 74 includes three crossing slots 82 at 120° spacing which all meet at the center 84 of the upper face 80. The slot width is twice the thickness of the lower edge 86, thus an edge 86 from each of two separate blocks can be inserted into any of the slots 82, and up to three blocks in a single tier can be supported by each lower block.

Thus each block can support and hold either zero, one, two (in two positions) or three blocks above itself to form a structure, and serves to interconnect the plurality of blocks held.

Figure 6A:
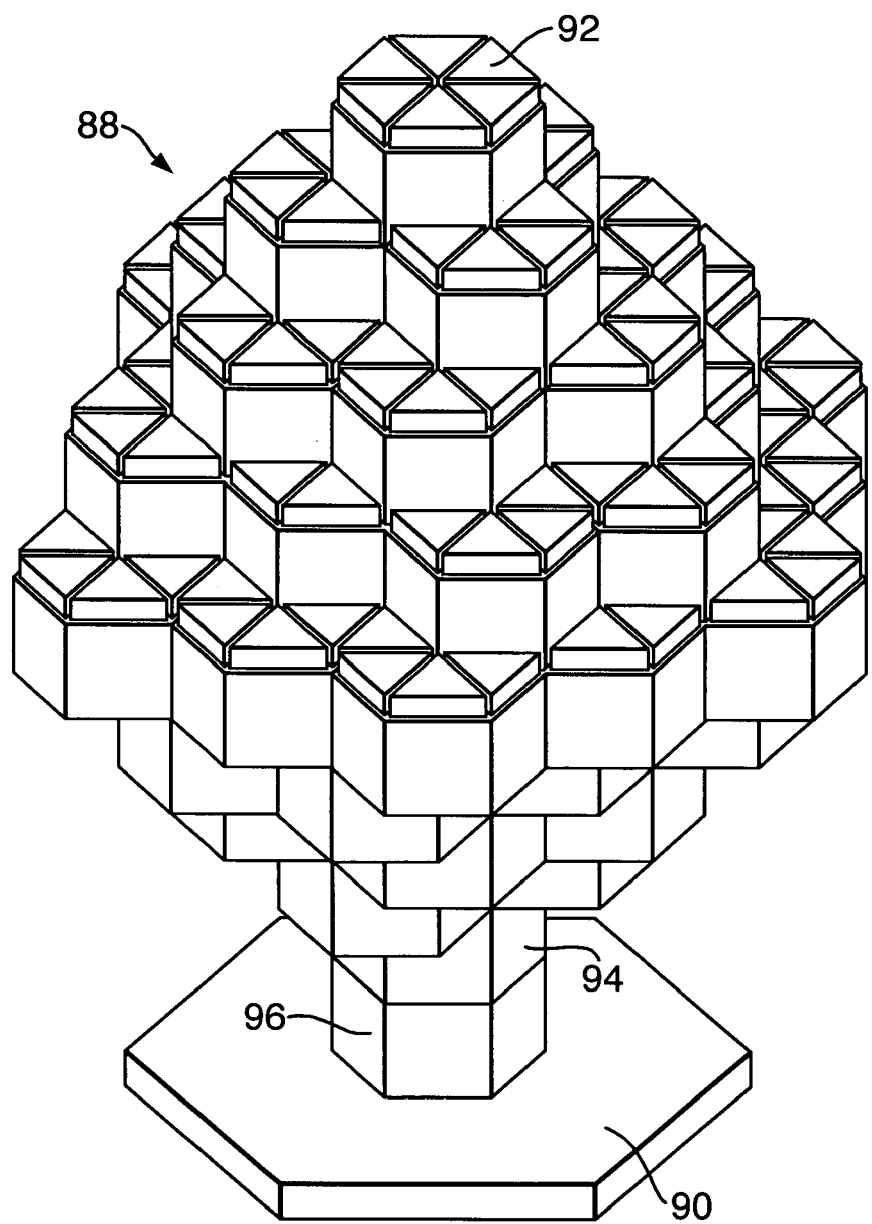
FIG. 6a is a pictorial view of an embodiment of the color globe mounted revolvably on a stand.
Figure 6B:
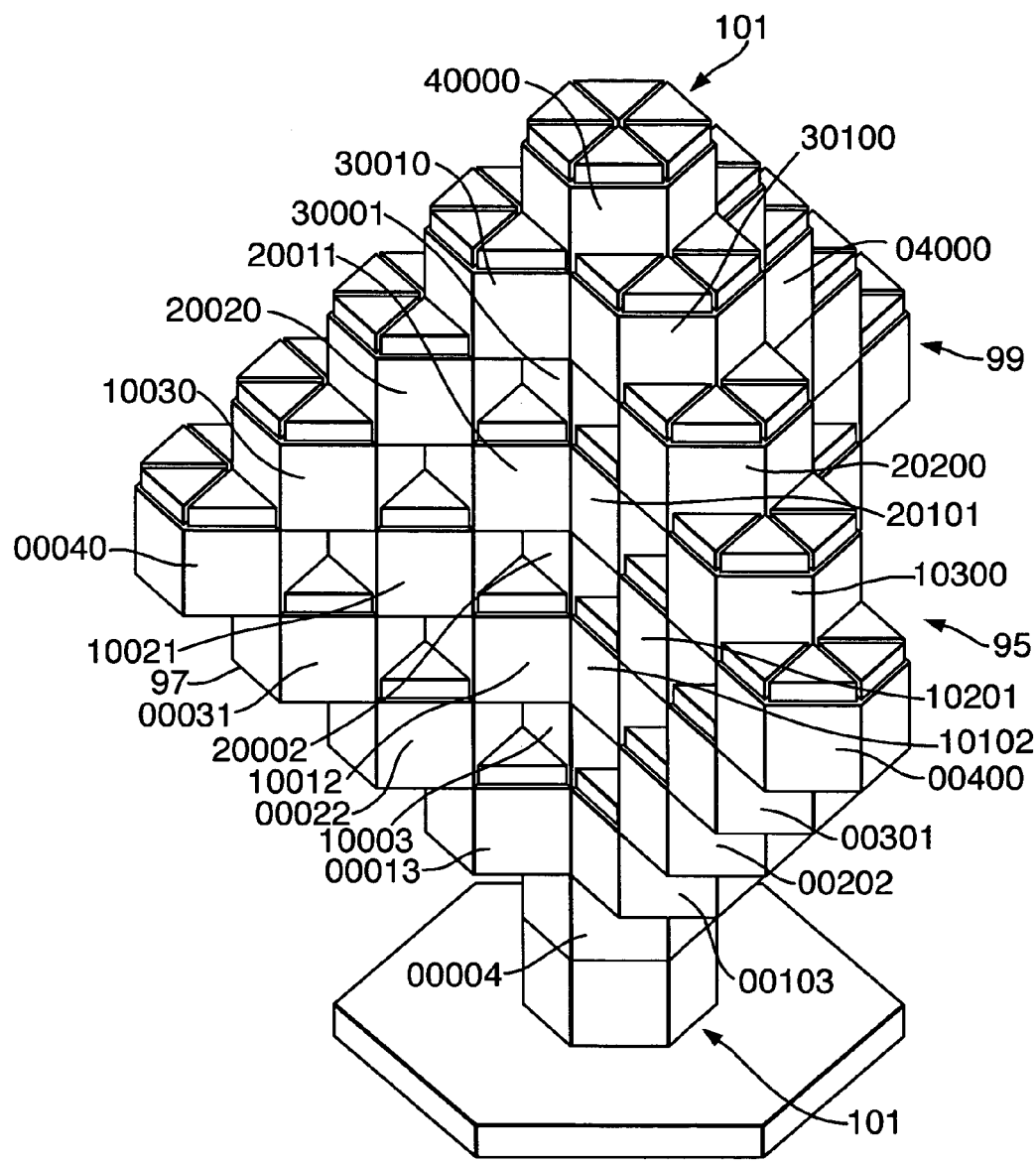
FIG. 6b is a globe of "pages" enabling a view of the inner blocks and the progression from the envelope of the globe to the center of the globe.

FIG. 6a shows a globe-like structure 88 supported on a stand 90.

In the preferred embodiment shown, the globe-like structure 88 is mounted to be revolvable about its pole blocks 92, 94 and around itself. A pivot member 96 is provided which comprises a cup-like element sized to accept a pole block 94 and which allows pole block 94 to freely revolve relative thereto and relative to the entire globe structure 88.

FIG. 6b shows a "page globe" which makes it possible to view the gradation between blocks forming the inner parts of the globe. In the Figure there are seen three pages 95, 97 and 99 connected to the axis 101 which axis is formed of white and black blocks at its poles. The page ends are the basic chroma colors red, yellow and blue which is the traditional globe. The same however can be arranged by changing the location of the basic colors.

FIG. 7a is a color circle 98 provided with both internal and external blocks 100, 102. The center block 104, as indicated by its number 20002, is gray. The outer circle comprises color blocks 102 not containing either black or white, as indicated by the number 0XXX0 may hold only one or two basic rainbow colors. Blocks 100 disposed in the intermediate circle are related to the hue of the external blocks with the addition of a small quantity of both white and black, as indicated by the numbers 1XXX1. Thus chroma decreases when moving from any point of the outer circle inwards towards the center block 104. It is to be noted that chroma decreases when moving from the rainbow colors towards the poles however this is not shown in this Figure which relates only to the equator tier.

Figure 7B:
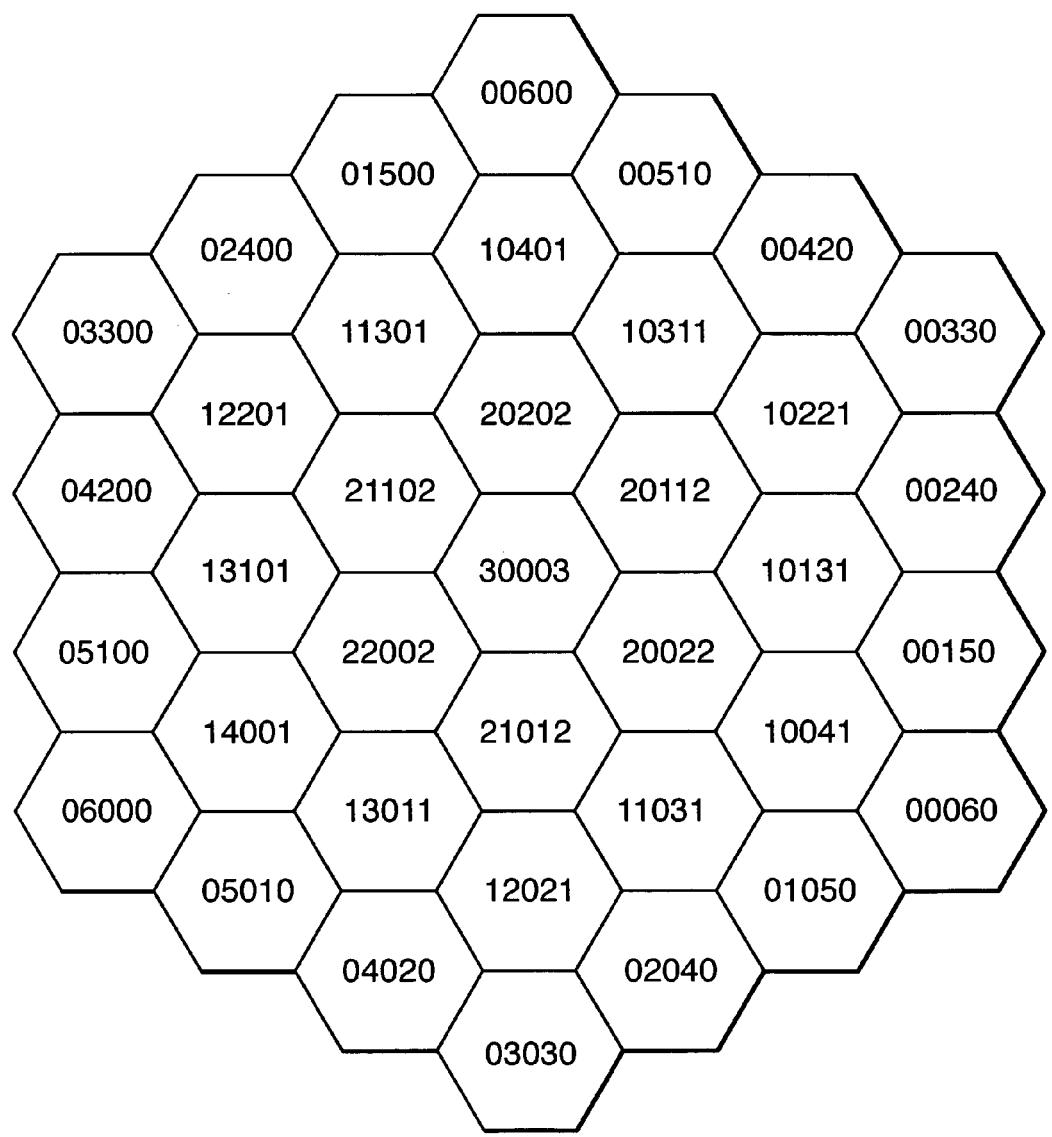
FIG. 7b is a top view of a central tier of a color globe wherein n=7.

FIG. 7*b* is a top view of a central tier of a color globe wherein n=7 provided with both internal and external blocks in a similar manner to that of FIG. 7*a* and is merely presented to illustrate the color values of the building blocks which could be used in such a tier.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An educational globe-like structure for teaching colors and the relationship between different colors, said globe-like structure being arranged to display the interrelationship between the five basic colors of yellow, blue, red, white and black simultaneously in both longitudinal and latitudinal directions, characterized in that said globe is constructed of at least 15 different colored interlocking toy building blocks, wherein blocks of 3 basic colors are disposed around the equator of said globe, wherein said equator is formed of at least 7 blocks including said 3 basic color blocks and the poles of said globe-like structure are formed, respectively, of 2 further basic colors and the remaining blocks intermediate between said blocks of basic colors represent interim colors between said five basic colors.

2. A globe-like structure according to claim 1, wherein each of said building blocks is marked with a number representing its own color which locates said color in relation to other adjacent colors according to a numbering system defining all colors and wherein all of the remaining non-basic colors in the globe-like structure are systematically arranged according to their relative properties vis a vis the basic colors.

3. A globe-like structure according to claim 2, wherein said numbering system is expanded to represent the three color properties known as chroma, hue and value.

4. A globe-like structure according to claim 1, being arranged to simultaneously display 34 out of 35 related colors, 3 of which are basic colors arranged around said equator and two at the poles.

5. A globe-like structure according to claim 1, being arranged to simultaneously display 65 out of 70 related colors, 3 of which are basic colors arranged around said equator and two at the poles.

6. A globe-like structure according to claim 1, wherein said colored toy building blocks are of hexagonal interlocking form, lower edges of adjacent higher blocks being insertable into slots in the upper face of lower blocks.

7. A globe-like structure according to claim 1, being supported on a stand.

8. A globe-like structure according to claim 7, being mounted to be revolvable about its poles and about itself.

9. An educational globe-like structure for teaching colors and the relationship between different colors according to claim 1, wherein said globe-like structure is arranged to display the interrelationship between colors simultaneously in both longitudinal and latitudinal directions, characterized in that said globe is constructed of at least 15 different colored interlocking toy building blocks and said poles are formed utilizing chromatic colors.

10. An educational globe-like structure for teaching colors and the relationship between different colors according to claim 1, wherein said globe-like structure is arranged to display the interrelationship between colors simultaneously in both longitudinal and latitudinal directions, characterized in that said globe is constructed of at least 15 different colored interlocking toy building blocks, wherein the 3 chromatic colors, blue, red and yellow are disposed in the same plane around the equator of said globe, and the poles of said globe-like structure are formed, respectively, of black and white building blocks.

* * * * *